(12) United States Patent
Yang

(10) Patent No.: US 7,484,266 B1
(45) Date of Patent: Feb. 3, 2009

(54) HINGE APPARATUS

(75) Inventor: Shan-Yi Yang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/968,006

(22) Filed: Dec. 31, 2007

(51) Int. Cl.
*E05F 3/20* (2006.01)

(52) U.S. Cl. ............................. 16/54; 16/303; 188/290

(58) Field of Classification Search ............... 16/303, 16/50, 51, 54; 188/290–296, 322.5
See application file for complete search history.

(56) References Cited

U.S. PATENT DOCUMENTS

| | | | | |
|---|---|---|---|---|
| 4,155,144 A | * | 5/1979 | Koganei | 16/54 |
| 4,829,628 A | * | 5/1989 | Vuksic | 16/54 |
| 4,938,322 A | * | 7/1990 | Sugasawara et al. | 188/290 |
| 5,301,775 A | * | 4/1994 | Nedbal et al. | 188/290 |
| 6,085,384 A | * | 7/2000 | Bivens | 16/54 |
| 6,913,125 B2 | * | 7/2005 | Hayashi | 188/290 |
| 7,065,834 B2 | * | 6/2006 | Lowry | 16/330 |
| 7,428,952 B2 | * | 9/2008 | Miyamoto | 188/290 |
| 2003/0150678 A1 | * | 8/2003 | Iwashita | 188/296 |
| 2007/0131500 A1 | * | 6/2007 | Yen et al. | 188/295 |

* cited by examiner

*Primary Examiner*—William L. Miller
(74) *Attorney, Agent, or Firm*—WPAT, P.C.; Anthony King

(57) ABSTRACT

A hinge apparatus includes a hinge and a damper. The damper includes a damping shell having a shell body. A cover board is formed on an end of the shell body, an axial hole is opened in the center of the cover board. A damping body received in the damping shell has a base portion and a column portion extending from one end of the base portion. The column portion extends outside the damping shell through the axial hole. A plurality of rotatable pieces and a plurality of limiting pieces are received in the shell body of the damping shell and alternately disposed on the column portion of the damping body. The rotatable pieces engage with the column portion so as to rotate together with the damping body, the limiting pieces are fixed to the damping shell. Damping oil is filled between the adjacent limiting pieces and the rotatable pieces. A hermetic ring is disposed on the damping body and pressed against the shell body. A rotatable body is adapted for pushing the damping body to rotate.

7 Claims, 5 Drawing Sheets

HINGE APPARATUS

BACKGROUND OF THE INVENTION

1. Field of the Invention

This present invention relates to a hinge apparatus, and more particularly to a hinge apparatus with a damper for smoothly opening or closing a foldable electronic device.

2. The Related Art

As the development of modern mobile communication industry, portable electronic devices such as cellular phones, notebook computers and personal digital assistants etc. are become more and more popular. Thereinto, many of the portable electronic devices have a function of displaying image. In order to display image as distinctly as possible, screens of the portable electronic devices need to be designed as big as possible. But it is not convenient to carry the portable electronic device with a big screen. That is, the required big screen and the required small size of the portable electronic device are self-contradictory. To solve the problem, the foldable electronic devices have been developed. Generally, the foldable electronic device has a cover which is used as a screen of the foldable electronic device, and a main body which is joined together with the cover by a hinge allowing the cover to be unfolded or folded from the main body.

Referring to FIG. 1, a traditional hinge includes a housing 3, a sliding cam 5, a rotatable cam 6, a spring 4, a shaft 7, an E-ring 8 and a cap 9. The sliding cam 5, the rotatable cam 6 and the spring 4 are received in the housing 3. A lower end of the sliding cam 5 defines two concave portions 51. An upper end of the rotatable cam 6 defines two pushing portions 61 for mating the two concave portions 51, and a lower end of the rotatable cam 6 extends out from the housing 3. A lower end of the spring 4 is fixed on the sliding cam 5, and an opposite end of the spring 4 is mounted on the cap 9 which plugs an upper end of the housing 3. The shaft 7 passes through the rotatable cam 6, the sliding cam 5, the spring 4 and the cap 9 and is locked by the E-ring 8. If the foldable electronic device needs opening, a user firstly unfolds the cover from the main body of the foldable electronic device at an angle. The force that the user provides pushes the pushing portions 61 to the top of the concave portions 51. At the same time, the sliding cam 5 is compelled to slide toward the upper end of the housing 3, and the spring 4 is compressed. Then, the user stops acting on the foldable electronic device, and the elastic force of the spring 4 drives the foldable electronic device opened fully.

However, the process that the compressed spring 4 drives the foldable electronic device opened fully is too quickly. Therefore, an impact is produced between the cover and the main body, so the foldable electronic device is easy to be broken or damaged.

SUMMARY OF THE INVENTION

Accordingly, an object of the invention is to provide a hinge apparatus with a damper for smoothly opening or closing a foldable electronic device.

The hinge apparatus arranged in a foldable electronic device includes a hinge and a damper. The hinge is adapted for producing and releasing an elastic force by rotating. The damper arranged coaxially with the hinge includes a damping shell having a shell body. A cover board is formed at one end of the shell body, and an axial hole is opened in the center of the cover board. A damping body received in the shell body of the damping shell. The damping body has a base portion and a column portion extending from one end of the base portion. The column portion extends outside the damping shell through the axial hole. A plurality of rotatable pieces and a plurality of limiting pieces are received in the shell body of the damping shell, the rotatable pieces and the limiting pieces are alternately disposed on the column portion of the damping body. The rotatable pieces engage with the column portion so as to rotate together with the damping body, the limiting pieces are fixed to the damping shell. Damping oil is filled between the adjacent limiting pieces and the rotatable pieces. A hermetic ring is disposed on the base portion of the damping body and pressed against the shell body. A rotatable body rotates together with the hinge and selectively engages with the damping body for pushing the damping body to rotate when the elastic force of the hinge is released.

As described above, by the cooperation of the rotatable pieces, the limiting pieces and the damping oil filled between the adjacent rotatable pieces and the limiting pieces, when the rotatable body pushes the damping body to rotate, the damping body rotates more softly, then the foldable electric device can be opened or closed more reliably.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 2:
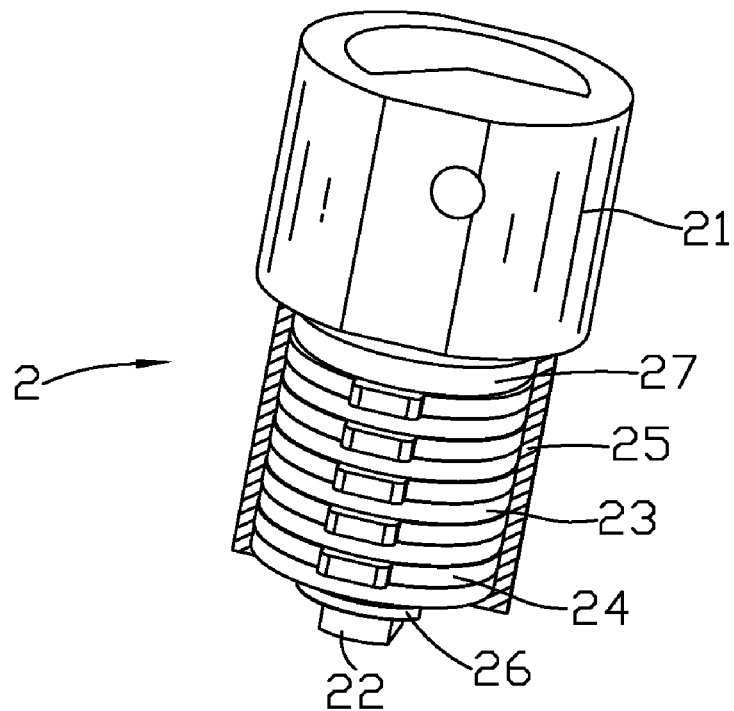
FIG. 2 is a perspective view of a hinge apparatus according to the present invention, a damping shell and a housing of the hinge apparatus are dissected partly.
Figure 2:
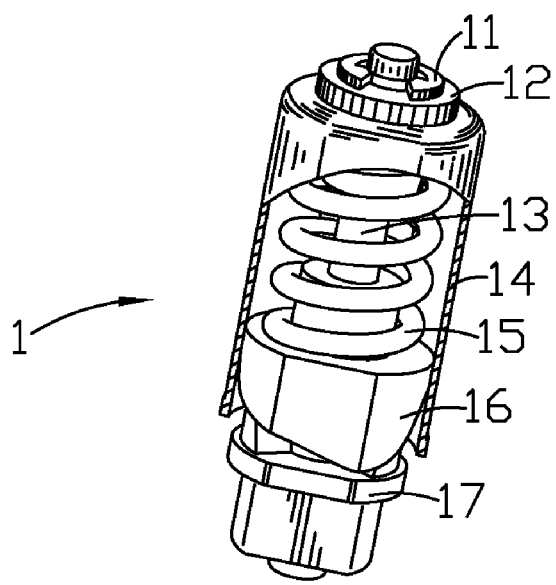
Figure 3:
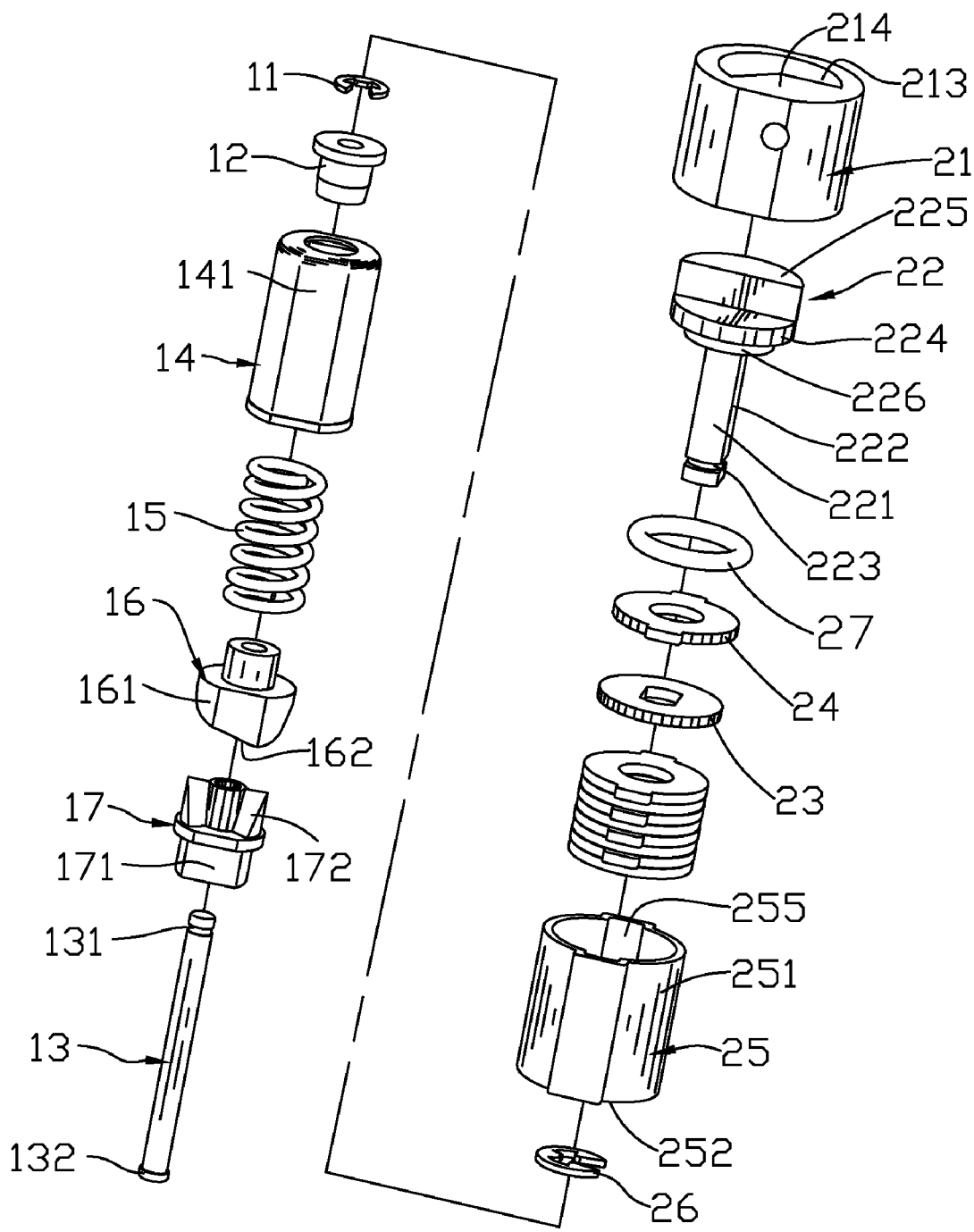
FIG. 3 is an exploded view of the hinge apparatus in FIG. 2.

Please refer to FIGS. 2, and 3, a hinge apparatus according to the present invention is shown. The hinge apparatus includes a hinge 1 and a damper 2.

Figure 1:
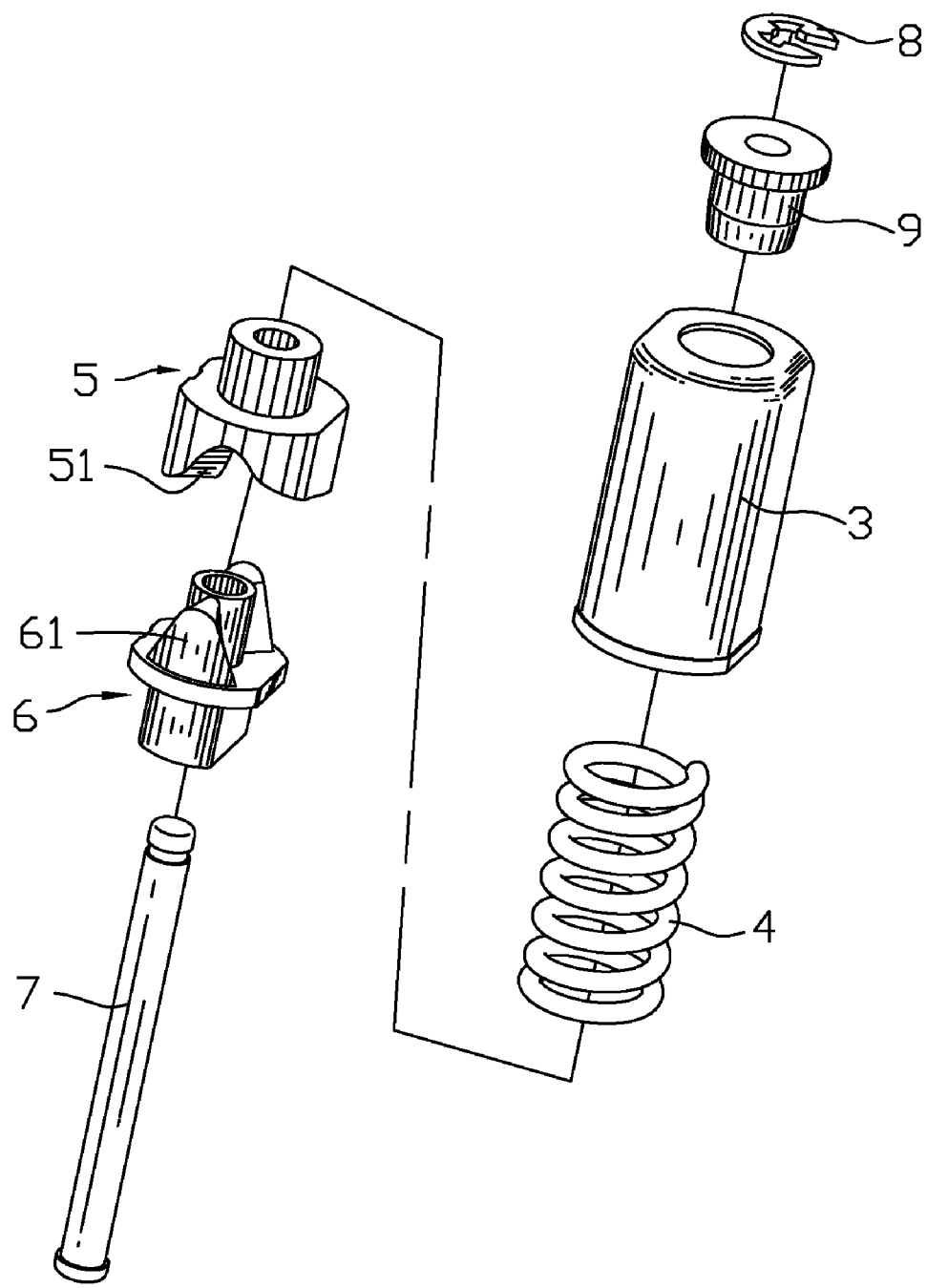
FIG. 1 is an exploded view of a prior hinge.

In FIGS. 2 and 3, the hinge 1 includes a limiting ring 11, a stopple 12, a cylindrical shaft 13, a substantially cylindrical housing 14, a helix-shaped spring 15, a sliding cam 16 and a rotatable cam 17. The hinge 1 is similar to the traditional hinge in FIG. 1.

Referring to FIG. 2 and FIG. 3 again, the housing 14 is hollow. Both ends of the housing 14 communicate with the outside. Two limiting sides 141 are formed in an outer surface of the housing 14. The stopple 12 which defines a through-hole (not labeled) plugs one end of the housing 14. The spring 15 and the sliding cam 16 are slideably received in the housing 14. An upper end of the spring 15 is fastened around the stopple 12 that protrudes into an inner of the housing 14, and an opposite end of the spring 15 is fixed on the sliding cam 16. The shaft 13 runs through the rotatable cam 17, the sliding cam 16, the spring 15 and the through-hole of the stopple 12 in turn. One end of the shaft 13 defines a notch 131 therearound and projects out of the stopple 12. The limiting ring 11 is provided to locate the shaft 13 on the stopple 12. The limiting ring 11 is E-shaped and defines a gap thereon. The limiting ring 11 is locked in the notch 131 of the shaft 13 and resists an upper surface of the stopple 12. The other end of the shaft 13 protrudes radially and outward to form a protruding portion 132. The protruding portion 132 of the shaft 13 is assembled out the rotatable cam 17 which mates with the sliding cam 16. The sliding cam 16 and the rotatable cam 17 will be described in detail hereinafter.

Please refer to FIGS. 2 and 3, the sliding cam 16 slidably received in the housing 14 has a substantially cylindrical accepting portion 161 that defines two concave portions 162 on a bottom thereof. Each of the concave portions 162 has an ascending curved surface and a descendent curved surface which is relative to the ascending curved surface. The rotatable cam 17 has a substantially column-shaped connecting portion 171. Two pushing portions 172 are extended downward from an upper surface of the connecting portion 171. The pushing portions 172 resist the concave portions 162.

In FIG. 2, the damper 2 includes a damping shell 25, a damping body 22, a plurality rotatable pieces 23, a plurality limiting pieces 24, a rotatable body 21, an E-shape ring 26 and a hermetic ring 27.

Figure 4:
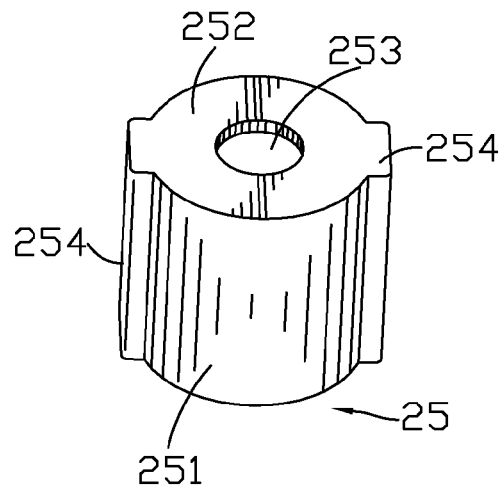
FIG. 4 is a perspective view showing the damping shell of the hinge apparatus in FIG. 3.
Figure 5:
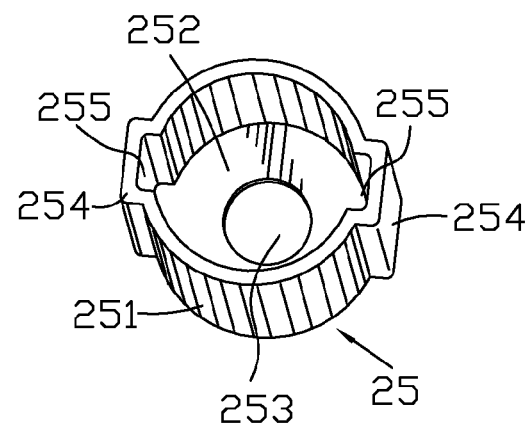
FIG. 5 is another perspective view of the damping shell in FIG. 4.

In FIGS. 4 and 5, the damping shell 25 includes a shell body 251 which is hollow and in substantially cylindrical shape. A cover board 252 is formed at one end of the shell body 251, and an axial hole 253 is opened in the center of the cover board 252. The shell body 251 has two opposite limiting walls 254 which project outward from an exterior surface of the shell body 251 and extend along an axial direction of the shell body 251. The two limiting walls 254 lock the damping body 25 to a foldable electronic device. An inner side of the shell body 251 defines two facing grooves 255 in the axial direction of the shell body 251 and corresponding to the limiting walls 254.

Figure 6:
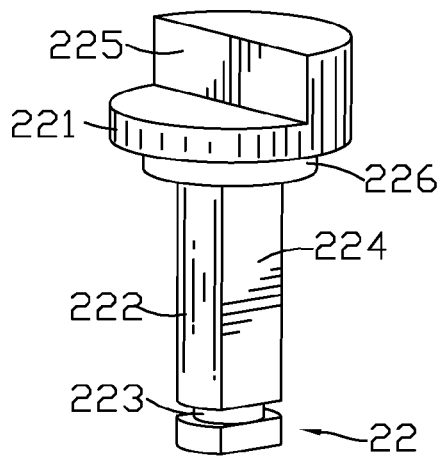
FIG. 6 is a perspective view of a damping body of the hinge apparatus in FIG. 3.

In FIG. 6, the damping body 22 received in the shell body 251 of the damping shell 25 includes a base portion 221 and a column portion 222 extending from the bottom of the base portion 221, the column portion 222 extends outside the damping shell 25 through the axial hole 253 and is rotatably secured on the cover board 252 of the damping shell 25. A ring-shaped slot 223 is formed in a lower end of the column portion 221. The column portion 222 defines two fixing planes 224 symmetrically in an axial direction thereof to make the column portion form an unrounded cross-section. A top surface of the base portion 221 protrudes upward to form a projection 225 showing a hemicycle shape at one side thereof. The bottom of the base portion 221 defines an accommodating groove 226 which has a diameter smaller than the diameter of the base portion 221 and bigger than the diameter of the column portion 222.

Figure 7:
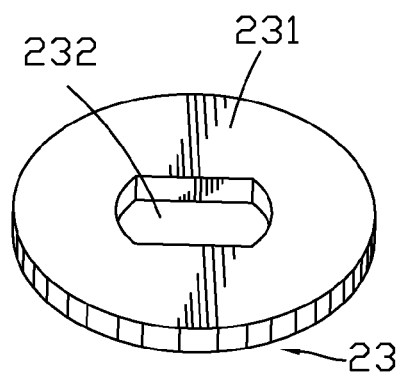
FIG. 7 is a perspective view of a rotatable piece of the hinge apparatus in FIG. 3.
Figure 8:
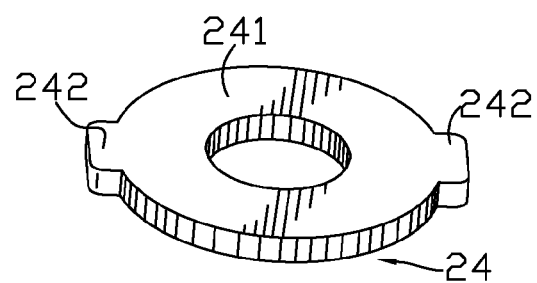
FIG. 8 is a perspective view of a limiting piece of the hinge apparatus in FIG. 3.

Referring to FIGS. 3, 7 and 8, the rotatable pieces 23 and the limiting pieces 24 are received in the shell body 251 of the damping shell 25 and alternately arranged around the column portion 222 of the damping body 22. Each of the rotatable pieces 23 has a first flake 231 which shows a substantially circular shape. An unrounded aperture 232 is opened in the center of the first flake 231 for matching the column portion 222, which make the rotatable pieces 23 rotate with the damping body 22 together. Each of the limiting pieces 24 has a second flake 241 which shows a substantially circular shape. Two opposite blocks 242 protrude from the margin of the second flake 241 and are latched into the two grooves 255 of the damping shell 25 respectively, thereby locking the limiting piece 24 to the damping shell 25 to prevent the limiting piece 24 rotating relative to the damping shell 25.

Figure 9:
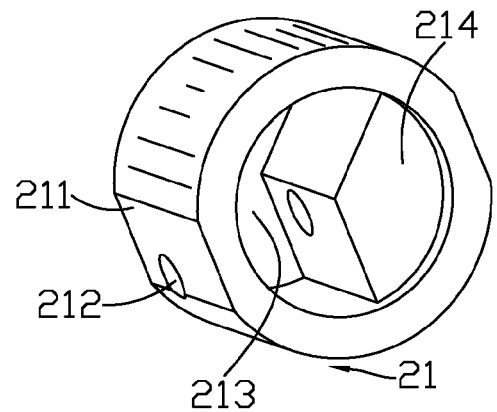
FIG. 9 is a perspective view of a rotatable body of the hinge apparatus in FIG. 3.
Figure 10:
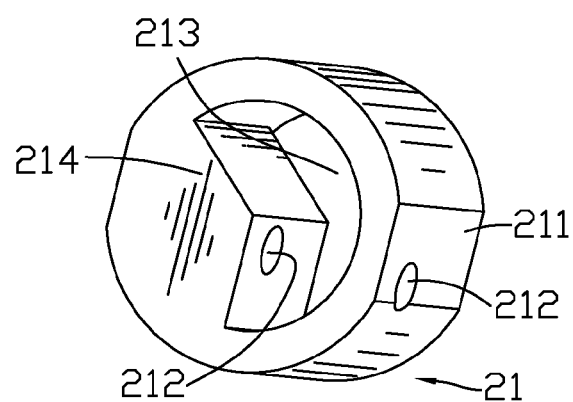
FIG. 10 is another perspective view of the rotatable body in FIG. 9.

Referring to FIGS. 3, 9 and 10, the rotatable body 21 symmetrically defines two limiting planes 211 in an outer surface thereof. A receiving hole 213 is opened in the center of the rotatable body 21 and perforates through the rotatable body 21. An inner wall of the rotatable body 21 partly protrudes inward to form a fan-shaped lump 214. The projection 225 of the damping body 22 is arranged in the surplus region of the receiving hole 213, thus the projection 225 can rotate in the surplus region of the receiving hole 213 and further alternately engage with two sides of the fan-shaped lump 214 to make the damping body 22 rotate with the rotatable body 21 together. The rotatable body 21 defines a screw hole 212 passing through the limiting planes 211 along a vertical direction of the axial direction of the rotatable body 21. A screw (not shown) is used for passing through the screw hole 212 and fixing the rotatable body 21 on the foldable electronic device.

In FIGS. 2 and 3, the E-shaped ring 26 is locked in the ring-shaped slot 223 of the damping body 22 and resists the outer surface of the cover board 252 of the damping shell 25. Damping oil (not shown) is provided to coat the surfaces of the rotatable pieces 23 and the limiting pieces 24. In order to avoid the damping oil leaking out, the hermetic ring 27 is placed around the accommodating groove 226 of the damping body 22 and pressed against the shell body 251 to form a hermetic region between the damping body 22 and the damping shell 25.

In use, the hinge apparatus is assembled on the foldable electronic device which has a cover and a main body. The housing 14 and the damping shell 25 are configured on the cover; the rotatable body 21 and the rotatable cam 17 are configured on the main body in the preferred embodiment.

When a user wants to open or close the foldable electronic device, the user firstly opens or closes the cover from the main body partly. Then the force the user provides drives the rotatable cam 17 and the rotatable body 21 rotating. The two pushing portions 172 of the rotatable cam 17 are pushed on the ascending curved surfaces of the two concave portions 162 of the sliding cam 16 respectively, the pushing portions 172 drive the sliding cam 16 sliding toward the inner of the housing 14 and so the spring 15 is compressed. At the moment, the fan-shaped lump 214 of the rotatable body 21 does not contact the projection 225 of the damping body 22, so the damping body 22 does not rotate with the rotatable body 21. When the two pushing portions 172 of the rotatable cam 17 slide to the descendent curved surfaces of the two concave portions 162 of the sliding cam 16 respectively, one side of the fan-shaped lump 214 is rotated to resist the projection 225. Then the damping body 22 and the rotatable pieces 23 rotate with the rotatable body 21 together, and the damping shell 25 and the limiting pieces 24 are in a relative motionless state. Because the damping oil is coated on the surfaces of the rotatable pieces 23 and the limiting pieces 24, which has a function of adhesive, so the rotation of the rotatable pieces 23 is restricted due to the adhesive function of the damping oil between the adjacent rotatable pieces 23 and the limiting pieces 24. As the damping body 22 rotates with the rotatable pieces 23, thereby the rotation rate of the damping body 22 is restrained. If the user stops acting on the foldable electronic device, the elastic force stored in the spring 15 drives the rotatable cam 17 rotating continually until the foldable electronic device is opened fully. Because of the restraining function of the damper 2, the cover is opened from or closed to the main body smoothly.

As described above, by the cooperation of the rotatable pieces 23, the limiting pieces 24 and the damping oil filled between the adjacent rotatable pieces 23 and the limiting pieces 24, when the rotatable body 21 pushes the damping body 22 to rotate, the damping body 22 rotates more softly, then the foldable electric device can be opened or closed more reliably.

What is claimed is:

1. A hinge apparatus, comprising:

a hinge adapted for producing and releasing an elastic force by rotating; and a damper arranged coaxially with the hinge, including a damping shell having a shell body, a cover board formed at one end of the shell body, an axial hole being opened in the center of the cover board, a damping body received in the shell body of the damping shell, the damping body having a base portion and a column portion extending from one end of the base portion, the column portion extending outside the damping shell through the axial hole, a plurality of rotatable pieces and a plurality of limiting pieces received in the shell body of the damping shell, the rotatable pieces and the limiting pieces being alternately disposed on the column portion of the damping body, the rotatable pieces engaging with the column portion so as to rotate together with the damping body, the limiting pieces being fixed to the damping shell, damping oil being filled between the adjacent limiting pieces and the rotatable pieces, a hermetic ring disposed on the base portion of the damping body and pressed against the shell body, and a rotatable body rotating together with the hinge and selectively engaging with the damping body for pushing the damping body to rotate when the elastic force of the hinge is being released.

2. The hinge apparatus as set forth in claim 1, further comprising an E-shaped ring, the column portion of the damping body defining a ring-shaped slot exposed outside the cover board of the damping shell, the E-shaped ring being arranged in the ring-shaped slot and against an outer surface of the cover board of the damping shell for securing the column portion.

3. The hinge apparatus as set forth in claim 1, wherein the column portion has an unrounded cross-section, each of the rotatable pieces has a first flake, the first flake defines an unrounded aperture matching the column portion.

4. The hinge apparatus as set forth in claim 1, wherein an inner side of the shell body defines two grooves in an axial direction of the shell body, each of the limiting pieces has a second flake, two blocks protrudes outward from the second flake for being locked in the grooves of the shell body.

5. The hinge apparatus as set forth in claim 1, wherein the base portion of the damping body protrudes upward to form a projection, the rotatable body defines a receiving hole for receiving the projection, an inner surface of the receiving hole protrudes inward to form a lump, two sides of the lump alternately engaging with the projection of the damping body.

6. The hinge apparatus as set forth in claim 5, wherein the projection and the lump are fan-shaped.

7. The hinge apparatus as set forth in claim 1, wherein the base portion of the damping body defines an accommodating groove therearound for arranging the hermetic ring.

\* \* \* \* \*